(12) United States Patent
Troska et al.

(10) Patent No.: US 11,318,688 B2
(45) Date of Patent: May 3, 2022

(54) ULTRASONIC JOINING METHOD AND ARRANGEMENT

(71) Applicant: Infineon Technologies AG, Neubiberg (DE)

(72) Inventors: Georg Troska, Warstein (DE); Olga Simon, Lippstadt (DE)

(73) Assignee: Infineon Technologies AG, Neubiberg (DE)

( * ) Notice: Subject to any disclaimer, the term of this patent is extended or adjusted under 35 U.S.C. 154(b) by 59 days.

(21) Appl. No.: 16/803,201

(22) Filed: Feb. 27, 2020

(65) Prior Publication Data
US 2020/0282663 A1    Sep. 10, 2020

(30) Foreign Application Priority Data

Mar. 7, 2019   (EP) .................................... 19161266

(51) Int. Cl.
*B29C 65/00*    (2006.01)
*B29C 65/08*    (2006.01)

(52) U.S. Cl.
CPC .......... *B29C 66/9441* (2013.01); *B29C 65/08* (2013.01); *B29C 66/8322* (2013.01); *B29C 66/91231* (2013.01)

(58) Field of Classification Search
CPC . B29C 66/9441; B29C 65/08; B29C 66/8322; B29C 66/91231; B29C 66/944; B29C 66/949; B29C 66/9492; B29C 66/91443; B29C 66/91441
See application file for complete search history.

(56) References Cited

U.S. PATENT DOCUMENTS

| | | | |
|---|---|---|---|
| 3,438,428 | A | 4/1969 | Balamuth et al. |
| 4,529,115 | A | 7/1985 | Renshaw et al. |
| 6,520,399 | B1 | 2/2003 | Salzer et al. |
| 6,612,479 | B2 | 9/2003 | Popoola et al. |

FOREIGN PATENT DOCUMENTS

| | | |
|---|---|---|
| CN | 104607794 A | 5/2015 |
| CN | 206010136 U | 3/2017 |
| CN | 108746912 A | 11/2018 |
| CN | 208289211 U | 12/2018 |
| EP | 0810055 A1 | 12/1997 |
| EP | 1302271 A1 | 4/2003 |
| EP | 2022589 A1 | 2/2009 |

OTHER PUBLICATIONS

Translation of IDS reference EP2022589A1; Inventors Wolfgang Leidholdt, Jens Trepte Roland Michel, Feb. 11, 2009 (Year: 2009).*

* cited by examiner

*Primary Examiner* — George R Koch
(74) *Attorney, Agent, or Firm* — Murphy, Bilak & Homiller, PLLC

(57) ABSTRACT

A method for joining at least two joining partners includes performing a plurality of ultrasonic joining operations in direct succession, wherein performing an individual ultrasonic joining operation includes, with a second joining tool, applying pressure to a second joining partner arranged adjacent to a first joining partner, thereby pressing the second joining partner against the first joining partner, and, with the second joining tool, applying high-frequency ultrasonic vibrations to the joining partners. The method further includes, during at least one intermediate time interval between two directly successive ultrasonic joining operations, at least one of actively cooling and heating the second joining tool.

16 Claims, 4 Drawing Sheets

ULTRASONIC JOINING METHOD AND ARRANGEMENT

TECHNICAL FIELD

This disclosure in general relates to an ultrasonic joining method and arrangement.

BACKGROUND

Ultrasonic joining techniques, e.g., ultrasonic welding or bonding, are widely employed to mechanically connect two joining partners. Thereby, a joining tool oscillating at an ultrasonic frequency mechanically presses a second joining partner with a pressing force against a first joining partner. For example, the first joining partner may be a semiconductor substrate or an electronic circuit board and the second joining partner may be a contact pin or any kind of connection element that allows to electrically contact the substrate or circuit board. Usually, a plurality of joining operations are performed in direct succession, using the same joining equipment. However, one or more process parameters may unintentionally change over successive joining operations. Generally, it is required to create reliable mechanical and electrical connections between two (or more) joining partners. When one or more process parameters change, however, this may result in a decrease of the quality of the connections.

Hence, there is a need for a method and an apparatus which allow the creation of reliable connections between joining partners, even if a plurality of connections are formed in direct succession using the same joining arrangement.

SUMMARY

One aspect relates to a method for joining at least two joining partners. The method includes performing a plurality of ultrasonic joining operations in direct succession, wherein performing an ultrasonic joining operation includes, with a second joining tool, applying pressure to a second joining partner that is arranged adjacent to a first joining partner, thereby pressing the second joining partner against the first joining partner, and, with the second joining tool, applying high-frequency ultrasonic vibrations to the joining partners. The method further includes, during at least one intermediate time interval between two directly successive ultrasonic joining operations, at least one of actively cooling and heating the second joining tool.

Another aspect relates to an ultrasonic joining arrangement including a first joining tool including a first support surface, and a second joining tool, configured to perform a plurality of ultrasonic joining operations in direct succession, wherein performing an ultrasonic joining operation includes applying pressure to a second joining partner and a first joining partner that are stacked on top of each other on the first support surface, thereby pressing the second joining partner against the first joining partner, and applying high-frequency ultrasonic vibrations to the joining partners. The second joining tool includes a temperature unit that is configured to at least one of actively cool down and heat up the second joining tool at least during one intermediate time interval between two directly successive ultrasonic joining operations.

The invention may be better understood with reference to the following drawings and the description. The components in the figures are not necessarily to scale, emphasis instead being placed upon illustrating the principles of the invention. Moreover, in the figures, like referenced numerals designate corresponding parts throughout the different views.

DETAILED DESCRIPTION

In the following detailed description, reference is made to the accompanying drawings. The drawings show specific examples in which the invention may be practiced. It is to be understood that the features and principles described with respect to the various examples may be combined with each other, unless specifically noted otherwise. In the description as well as in the claims, designations of certain elements as "first element", "second element", "third element" etc. are not to be understood as enumerative. Instead, such designations serve solely to address different "elements". That is, e.g., the existence of a "third element" does not require the existence of a "first element" and a "second element". A semiconductor body as described herein may be made from (doped) semiconductor material and may be a semiconductor chip or may be included in a semiconductor chip. A semiconductor body has electrically connecting pads and includes at least one semiconductor element with electrodes.

Figure 1:
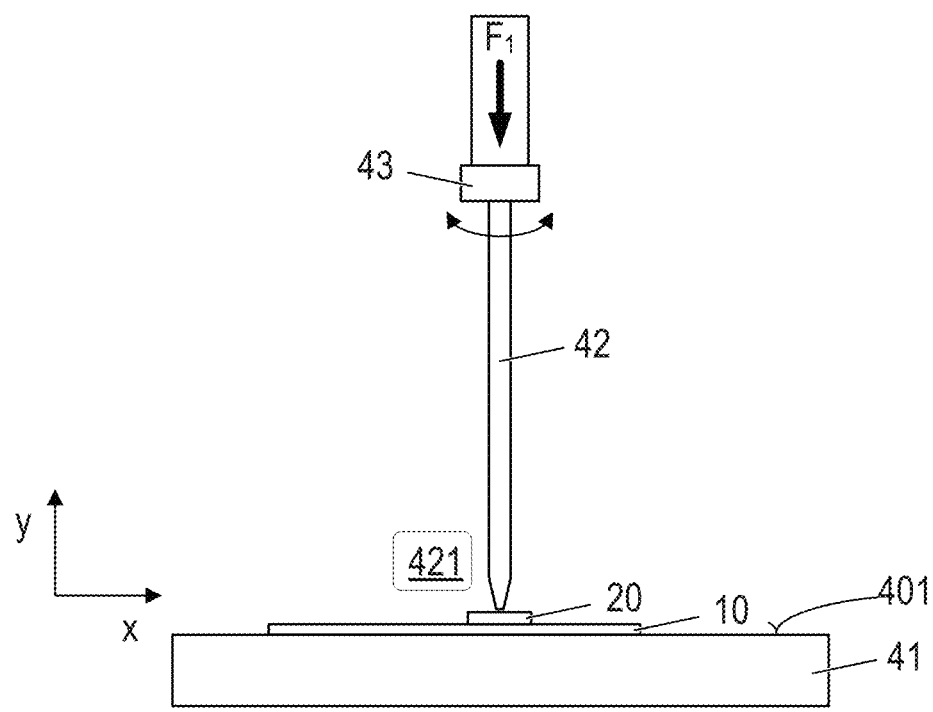
FIG. 1 schematically illustrates an ultrasonic joining arrangement for forming a connection between two joining partners.

FIG. 1 schematically illustrates a joining arrangement according to one example. The joining arrangement includes a first joining tool 41 such as an anvil, for example, and a second joining tool 42 such as a sonotrode, for example. The first joining tool 41 comprises a first support surface 401. A first joining partner 10 and a second joining partner 20 may be stacked onto each other and may be arranged on the first support surface 401. The second joining tool 42 may comprise or may be coupled to an ultrasonic transducer 43 and a temperature unit 421. The temperature unit 421 may be configured to at least heat up or cool down an area of the second connection tool 42 that is in direct contact with the second joining partner 20 during a joining process. According to one example, the second joining partner 20 may first be arranged on the first joining partner 10, and the stack formed by the joining partners 10, 20 may then be arranged on the support surface 401. "On" in this context does not necessarily define the order of the joining partners 10, 20 with respect to a ground surface, but rather with respect to the first support surface 401. "Upside down" joining arrangements are known, wherein the first support surface 401 faces "downwards" towards the ground surface (not specifically illustrated). According to another example, the first joining partner 10 may be arranged on the support surface 401, and the second joining partner 20 may then be arranged on the first joining partner 10 such that the first joining partner 10 is arranged between the second joining partner 20 and the first support surface 401. It is also possible that a stack is formed by more than two joining partners that are to be connected to each other.

The ultrasonic transducer 43 causes the second joining tool 42 to oscillate at an ultrasonic frequency, e.g., torsionally (rotary) around a vertical axis y (twisting motion). This, however, is only an example. Other second joining tools 42 are possible, e.g., linear sonotrodes having a hammer-like form. The ultrasonic frequency may be between 15 kHz and 79 kHz, for example. In FIG. 1, a double arrow schematically illustrates the direction of the oscillation. The ultrasonic transducer 43 is mechanically coupled to the second joining tool 42 so that the ultrasonic transducer 43 introduces an ultrasonic amplitude to the second joining tool 42. The ultrasonic transducer 43 is configured to stimulate the second joining tool 42 at a resonance frequency. The resonance frequency of the second joining tool 42 may change during the joining process. Therefore, it may be necessary to adjust the ultrasonic frequency during a joining process. The ultrasonic frequency may be adjusted using a phase-locked loop (PLL) or pulse-width modulation (PWM), for example.

During a joining operation of the joining arrangement, i.e. when the joining arrangement is forming a connection (e.g., welded or bonded) between a first joining partner 10 and a second joining partner 20, the first joining partner 10 is (directly or indirectly) placed adjacent (on or below) and, optionally, fixed (e.g. clamped, sucked, adhered, etc.) to the support surface 401 of the first joining tool 41. The second joining partner 20 (i.e. at least a section of the second joining partner 20) is arranged adjacent to the first joining partner 10 such that the first joining partner 10 is arranged between the second joining partner 20 and the support surface 401. The second joining tool 42 is moved towards the second joining partner 20 such that it contacts the second joining partner 20 and presses the second joining partner 20 against the first joining partner 10 with a pressing force $F_1$. Thereby, the second joining partner 20 physically contacts the first joining partner 10. According to one example, the first joining partner 10 may be a semiconductor substrate or a printed circuit board, and the second joining partner 20 may be a contact pin or any kind of connection element that allows to electrically contact the substrate or circuit board, a semiconductor chip or a semiconductor body. However, any other types of joining partners 10, 20 may be arranged on the first joining tool 41 and may be permanently connected to each other by performing an ultrasonic joining operation. Joining partners 10, 20 may comprise any kind of metallic or hard or soft (thermo)plastic materials, for example. It is possible to form connections between two or more first joining partners 10 and a single second joining partner 20, or between two or more second joining partners 20 and a single first joining partner 10, for example.

With the first pressing force $F_1$ applied, the ultrasonic transducer 43 starts oscillating, e.g., around the vertical axis y or in the lateral direction x, depending on the kind of sonotrode that is used, at an ultrasonic frequency $f_1$ and forces the second joining tool 42 to also oscillate at a resonance frequency, e.g., around the vertical axis y or in the lateral direction x. In this way, energy is transferred into the interface region between the first and the second joining partner 10, 20, and a tight connection between the first and the second joining partner 10, 20 is formed. If the first and the second joining partner 10, 20 are both electrically conductive, an electrical connection between the first and the second bonding partner 10, 20 may also be formed.

FIG. 1 illustrates only one possible example of how a second joining tool 42 and an ultrasonic transducer 43 may be implemented. Other kinds of joining arrangements are generally known such as, e.g., linear sonotrodes, bending sonotrodes (also referred to as linear bending welding sonotrodes), torsional welding sonotrodes, or flexural resonators. The second joining tool 42 may oscillate around a vertical axis y, as is illustrated in FIG. 1. Other joining tools 42 are known which, e.g., oscillate in a horizontal direction x (e.g., linear welding). Oscillation of the second joining tool 42 in any other suitable directions or around any other suitable axes is also possible.

Usually, a plurality of joining operations is performed in direct succession. That is, a first and a second joining partner 10, 20 are connected to each other during a joining operation, the second joining tool 42 then moves to another first and second joining partner 10, 20 and forms another joint during a subsequent joining operation. As has been described above, during one joining operation also two or more first joining partners 10 may be connected with one second joining partner 20, or two or more second joining partners 20 may be joined with one first joining partner 10. In this way, a plurality of joining operations may be performed, with an intermediate time interval between two directly successive joining operations. During each intermediate time interval between two directly successive joining operations, the second joining tool 42 may be moved to the next joining partners 10, 20 that are to be connected. Other joining arrangements are known wherein the second joining tool 42 remains static and the next joining partners 10, 20 are arranged on the first support surface 401, for example. The first joining tool 41 may be movable, for example. During these intermediate time intervals, no pressing force is applied. The second joining tool 42 may or may not oscillate during the intermediate time intervals. In other words, the second joining tool 42 is practically inactive during the intermediate time intervals. "Practically inactive" in this context means that no joining operation is performed. However, the second joining tool 42 may still oscillate during the intermediate time intervals, e.g., to clean the second joining tool 42. Due to the oscillations, any contaminants may be cast off from the second joining tool 42. Further, it is possible to determine the natural resonant frequency and the idle power of the second joining tool 42 during the intermediate time intervals, for example.

Each joining operation generally takes a certain time, e.g., between 50 ms (milliseconds) and 10 s (seconds). During this time, a temperature of the second joining tool 42 generally increases, e.g., due to the oscillations and the pressure that is applied to the joining partners 10, 20, and in particular due to the resulting friction between the joining partners 10, 20 and between the second joining tool 42 and the joining partners 10, 20. During the intermediate time intervals, when the second joining tool 42 is practically inactive (as has been described above), the temperature of the second joining tool 42 decreases again. Each intermediate time interval may take a certain time, e.g., between 200 ms and 30 s. The length of an intermediate time interval may depend on the time that is needed to arrange the next joining partners 10, 20 on the first joining tool 41 and to position the second joining tool 42 in a starting position, for example. In the starting position, the second joining tool 42 may be arranged above the stack formed by the joining partners 10, 20. In the starting position, the second joining tool 42 may contact the second joining partner 20, however, without applying any significant force yet and without oscillating, for example.

Figure 2:
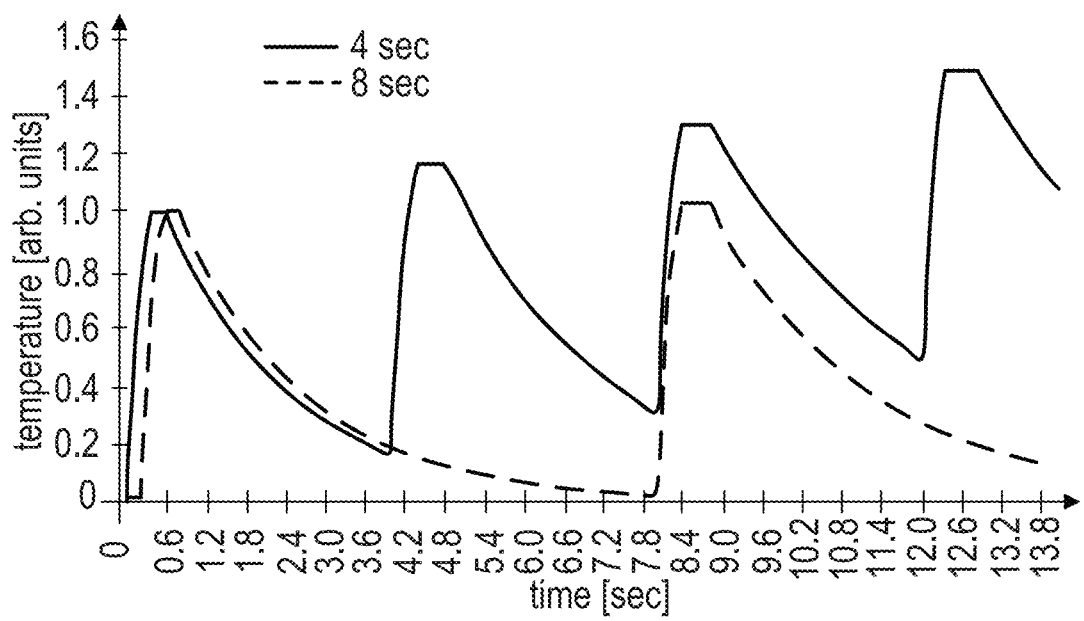
FIG. 2 illustrates the temperature of a joining tool over time, when performing a plurality of successive joining operations.

The heating and cooling of a conventional second joining tool 42 (e.g., sonotrode) is schematically illustrated in the diagram in FIG. 2. A first curve, illustrated in a solid line in FIG. 2, illustrates the heating and cooling of a second joining tool 42 during four successive joining operations, the duration of each joining operation being 500 ms. The intermediate time interval between directly successive joining operations is 4 s in the example of FIG. 2. The temperature axis does not illustrate an actual temperature. The diagram merely serves to schematically illustrate the general problem of conventional joining arrangements. During each joining operation, the second joining tool 42 heats up by a certain amount. For example, the second joining tool 42 may heat up by 200° C. due to the oscillation and the force applied to the joining partners 10, 20. On the temperature axis illustrated in FIG. 2, this certain amount is designated by 1.0. However, 1.0 in FIG. 2 may also indicate any other temperature. During the following intermediate time interval, the second joining tool 42 cools down to a certain degree. However, an intermediate time interval of 4 s may not be long enough for the second joining tool 42 to cool down to its initial temperature (initial temperature=temperature before the first joining operation, designated as 0 in FIG. 2). Therefore, when the next joining operation starts, the temperature of the second joining tool 42 is higher than the initial temperature. During the next joining operation, however, the increase of the temperature of the second joining partner 42 is comparable to the increase during the first joining operation (assuming that the process parameters are similar during a plurality of successive joining operations). Therefore, the temperature of the second joining tool 42 after the second joining operation may be higher than the temperature of the second joining tool 42 after the first joining operation. The next intermediate time interval may again be too short for the second joining tool 42 to cool down to its initial temperature. With each joining operation, therefore, the second joining operation 42 heats up more and more.

If a plurality, e.g., 3 to 25 or more, of joining operations are performed successively, with an intermediate time interval between two directly successive joining operations that is short and does not allow the second joining tool 42 to cool down to its initial temperature, the process conditions may change during the course of the plurality of joining operations. Therefore, the connections formed at the beginning (e.g., first 10 joining operations) may significantly differ from joints formed towards the end (e.g., last 10 joining operations) of the plurality of joining operations. However, the requirements for forming ultrasonic connections are generally very high. It is generally essential to continuously form reliable connections. Differences of the temperature of the second joining tool 42, however, may lead to variations between different connections.

Generally, one possibility to improve the reliability of the joining process is to increase the duration of the intermediate time intervals. This is exemplarily illustrated in dashed lines in FIG. 2. The process time of 500 ms remains the same, however, the intermediate time intervals each have a duration of 8 s in this example. After an intermediate time interval of 8 s, the second joining tool 42 may have cooled down essentially to or close to its initial temperature. Therefore, the temperature is the same or at least similar at the beginning of each successive joining operation. The process conditions, therefore, are the same, or at least very similar, for all joining operations of a plurality of successive joining operations. However, the overall time that is needed to form the plurality of joining operations increases. In the first example (solid line in FIG. 2), 100 connections may be formed after a total time of (100*500 ms)+(99*4 s)=446 s, wherein in the second example (dashed line in FIG. 2), 100 connections may be formed after a total time of (100*500 ms)+(99*8 s)=842 s. Generally, however, for reasons of costs and efficiency, it is desirable to keep the total time as short as possible. Therefore, increasing the duration of the intermediate time intervals in many cases is not acceptable.

Figure 5A:
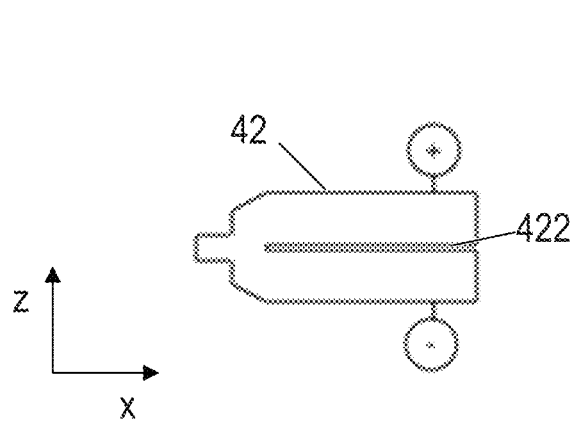
FIGS. 5A to 5C schematically illustrate different views of exemplary joining tools.

According to one example, the second joining tool 42 comprises or is coupled to a temperature unit 421 that is configured to actively adjust the temperature of the second joining tool 42, e.g., heat up or cool down the second joining tool 42. The temperature unit 421 may comprise a heating unit, for example. A heating unit may be implemented in any suitable way. For example, the temperature unit 421 may comprise a laser unit that is configured to heat the second joining tool 42 using laser light. According to another example, the temperature unit 421 may comprise an induction unit for inductively heating the second joining tool 42. To inductively heat the second joining tool 42, a coil may be arranged to surround at least a part of the second joining tool 42, e.g., the tip of a sonotrode which is in contact with the second joining partner 20. For example, an alternating current may be applied to the coil at a frequency of, e.g., 100 kHz. This may result in eddy currents in the second joining tool 42, e.g., in the tip of the second joining tool 42, which causes the second joining tool 42 to heat up. According to another example, which is schematically illustrated in FIG. 5A, a second joining tool 42 may comprise a slot 422. FIG. 5A illustrates a top view of a second joining tool 42. The second joining tool 42, as seen from above, may be generally U-shaped. One leg of the U-shaped second joining tool 42 may be coupled to a positive potential, and a second leg of the U-shaped second joining tool 42 may be coupled to a negative potential. A high current of, e.g., 100A may be applied, thereby heating the second joining tool 42.

The temperature unit 421 may be configured to actively heat the second joining tool 42 during at least one of the intermediate time intervals. The temperature unit 421, however, may be inactive during the joining operations. The temperature unit 421 may be configured to actively heat the second joining tool 42 during all of the intermediate time intervals between two successive joining operations of a plurality of successive joining operations. However, it might not be necessary to actively heat the second joining tool 42 during all of the intermediate time intervals. In some arrangements it may be sufficient to actively heat the second joining tool 42 only during some of the intermediate time intervals. For example, it may be sufficient if the second joining tool 42 is actively heated during less than 10%, less than 25%, less than 40% or less than 50% of the plurality of intermediate time intervals. Heating the second joining tool 42 only during a single one of the plurality of intermediate time intervals may also be sufficient for some arrangements.

For example, the second joining tool 42 may be actively heated only at the beginning of the plurality of joining operations and may not be actively heated towards the end of the plurality of joining operations. It may not be necessary to actively heat the second joining tool 42 towards the end of the plurality of joining operations, because the temperature of the actively heated second joining tool 42 may still increase to a certain degree during the individual joining operations, e.g., due to the applied frequency and pressure. Therefore, after a certain number of joining operations the temperature of the second joining tool 42 may have increased to above a certain threshold temperature and may subsequently not fall below this temperature threshold which may make active heating of the second joining tool 42 superfluous.

Figure 3:
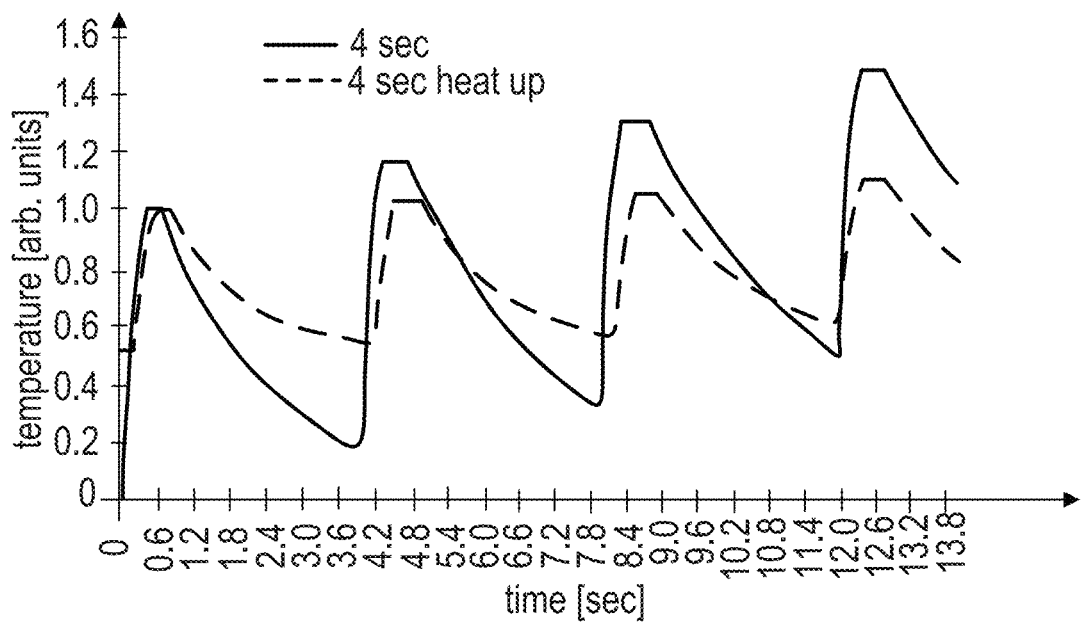
FIG. 3 illustrates the temperature of a heated joining tool versus a conventional joining tool over time, when performing a plurality of successive joining operations.

Optionally, the second joining tool 42 may also be actively heated before performing the first joining operation of a plurality of joining operations. In this way, the initial temperature of the second joining tool 42 before performing the first joining operation of the plurality of joining operations may be increased to a defined initial temperature. This is exemplarily illustrated in the diagram of FIG. 3. The curve illustrated in a solid line in FIG. 3 corresponds to the curve illustrated in a solid line in FIG. 2 (second joining tool 42 not actively heated, intermediate time intervals 4 s each, duration of joining operations 500 ms each). When the initial temperature before the first joining operation is higher, an initial energy that is needed during the first joining operation in order to form a reliable joining may be smaller as compared to a joining operation starting at a lower initial temperature. The process conditions in this way may be kept essentially constant over a plurality of subsequent joining operations. This is exemplarily illustrated in a dashed line in FIG. 3. The second joining tool 42 in this example is heated to an initial temperature of approximately 0.5 (e.g., 80° C.) in this example. The initial temperature before each of the plurality of joining operations is essentially constant. The maximum temperature that is reached after each of the joining operations is also essentially constant. The initial temperature may not remain constant throughout the plurality of joining operations. However, an increase of the initial temperature towards the last ones of the plurality of joining operations may be small and negligible as compared to an arrangement without actively heating the second joining tool 42.

According to another example, the second joining tool 42 is actively cooled down during at least one of the intermediate time intervals. While in conventional ultrasonic joining arrangements, the second joining tool 42 cools down passively (temperature alignment to ambient temperature), an active cooling unit may be used in the arrangement of FIG. 1. In this way, the second joining tool 42 may be actively cooled down to its initial temperature during each intermediate time interval, without increasing the duration of the intermediate time intervals. On the contrary, by means of effective cooling, the duration of the intermediate time intervals may even be reduced as compared to conventional ultrasonic joining arrangements.

Figure 4:
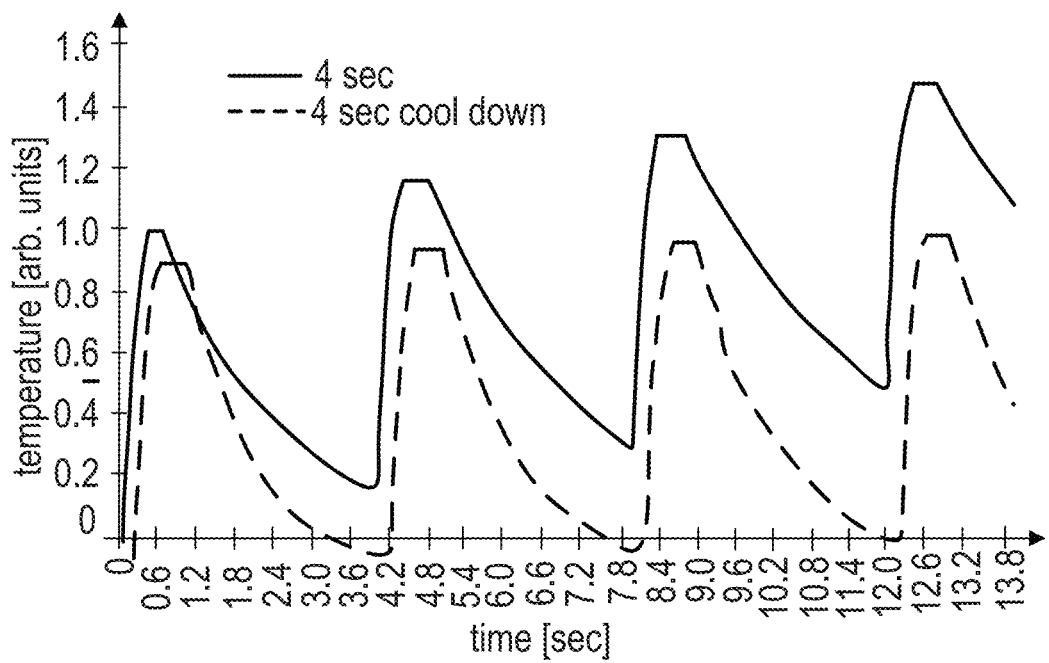
FIG. 4 illustrates the temperature of a cooled joining tool versus a conventional joining tool over time, when performing a plurality of successive joining operations.

This is exemplarily illustrated in FIG. 4. The curve illustrated in a solid line in FIG. 4 corresponds to the curve illustrated in a solid line in FIGS. 2 and 3. This curve illustrates the temperature of the second joining tool 42 that is not actively cooled down during intermediate time intervals of 4 s. The dashed line in FIG. 4 illustrates the temperature of an actively cooled second joining tool 42. After each joining operation, the temperature of the second joining tool 42 is cooled down to or even below its initial value. The duration of the intermediate time intervals in the example of FIG. 4 does not increase and remains at 4 s. The process conditions, therefore, remain essentially constant from the first joining operation throughout the plurality of joining operations to the last joining operation. A duration of the intermediate time intervals of 4 s, however, is only an example. The duration of the intermediate time intervals generally may be shorter or longer than 4 s.

The temperature unit 421 that is used to actively cool down the second joining tool 42, may be active only during the intermediate time intervals. The temperature unit 421 may be inactive during each of the plurality of joining operations.

If the temperature unit 421 comprises a cooling unit, cooling of the second joining tool 42 may be implemented in any suitable way. According to one example, an air flow may be generated that is directed towards the second joining tool 42 and that is configured to cool down the second joining tool 42. For example, an ultrasonic joining arrangement may comprise at least one tube, e.g., of steel or plastic. The outlet of such a tube may be directed towards the second joining tool 42. Air may pass through the tube towards the second joining tool 42, the air having a desired temperature and creating an air flow which cools down the second joining tool 42. According to another example, a joining arrangement may comprise a fan creating an air flow towards the second joining tool 42. However, such tubes or fans are generally rather large and may possibly impede the movements of the second joining tool 42.

The temperature unit 421 may alternatively or additionally comprise any kind of radiator or chiller, for example. It is further possible, that the temperature unit 421 comprises at least one Peltier element. For example, at least one Peltier element may be arranged between a chiller and the second joining tool 42. Other cooling mediums may be used to cool down the second joining tool 42 such as water, antifreeze agents or alcohol, for example. According to another example, the second joining tool 42 may be cooled down by evaporative cooling. This is exemplarily illustrated in the side view of FIG. 5B, for example. A cooling liquid may flow through a capillary 424. Near an outlet 426 of the cooling liquid, the diameter of the capillary 424 may increase from a smaller diameter to a larger diameter in the direction of the flow of the cooling liquid. Because of this enlarged diameter, the cooling liquid, which is liquid at first, changes its phase into its gaseous phase, using the thermal energy in the air, resulting in a lower air temperature, thereby cooling the second joining tool 42. The evaporative cooling effect may result from an extension of the gas resulting from the increased diameter of the capillary 424. This effect is in correspondence with the ideal gas law.

Figure 5B:
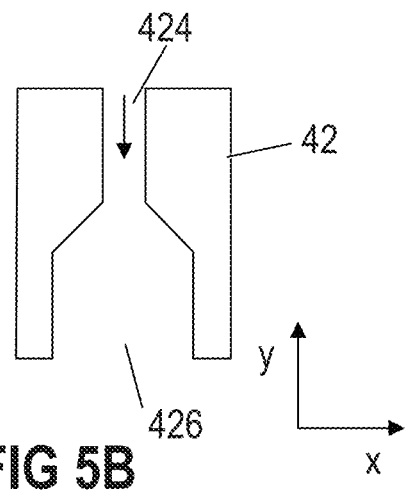

Generally it is possible to form a capillary 424 inside the second joining tool 42, as is exemplarily illustrated in FIG. 5B. According to another example, however, it is also possible to attach a capillary 424 to the second joining tool 42 in any suitable way. A capillary 424 may be directly attached to the second joining tool 42 by means of soldering, brazing, or gluing, for example. It is, however, also possible that a capillary 424 is not directly attached to the second joining tool 42. For example, a capillary 424 may be arranged close to the second joining tool 42, with its output directed towards the second joining tool 42. For example, an output of a capillary 424 may be arranged within a range of 5 mm or 10 mm from the tip of the second joining tool 42, wherein the tip of the second joining tool 42 is configured to contact the topmost of the joining partners, e.g., the second joining partner 20. A cooling liquid that is directed through the capillary 424 may comprise, e.g., $CO_2$, FCKW, Tetrafluorethan R-134a, or $C_3F_8$. Any other suitable cooling liquids that liquefy at preferably low pressures are also possible.

Figure 5C:
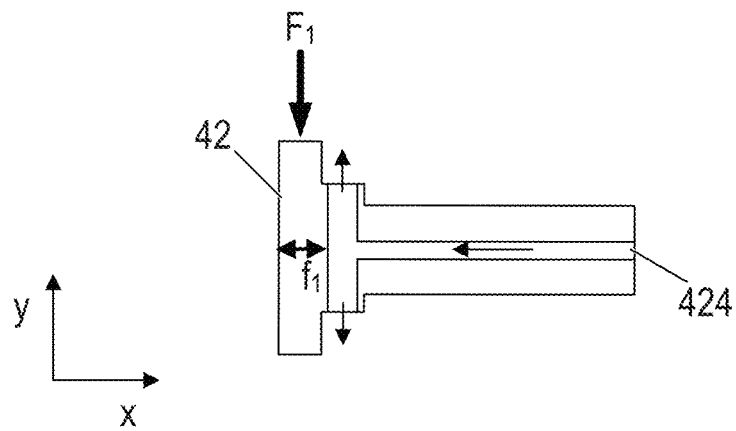

FIG. 5C schematically illustrates an example of a second joining tool 42 (e.g., linear welding sonotrode) comprising a capillary 424 for evaporative cooling. A first section of a capillary 424 may extend through the second joining tool 42 in a vertical direction y. A second section of a capillary 424 may extend through the second joining tool 42 in a horizontal direction x. The first section may comprise one or more outlets through which a cooling liquid may exit the capillary 424. The outlets and the direction of flow of the cooling liquid are exemplarily illustrated with arrows in FIG. 5C. The second section may be coupled to the first section such that cooling liquid inserted into the second section further streams into the second section. A diameter of the second section may be smaller than a diameter of the first section. At the transition between the second section and the first section, therefore, the cooling liquid changes its phase, thereby cooling the second joining tool 42. The directions in which the pressing force $F_1$ and the oscillations at the oscillating frequency $f_1$ are applied, are illustrated with arrows in FIG. 5C.

Figure 6:
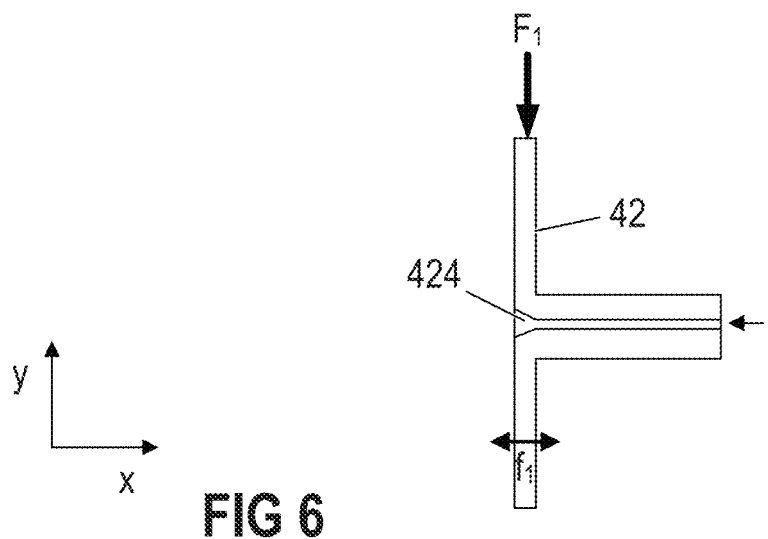
FIG. 6 illustrates an exemplary joining tool.

Now referring to FIG. 6, a second joining tool 42 comprising a flexural resonator is exemplarily illustrated. The directions in which the pressing force $F_1$ and the oscillations at the oscillating frequency $f_1$ are applied, are illustrated with arrows in FIG. 6. The second joining tool 42 may comprise a capillary 424 extending in a horizontal direction x. The diameter of the capillary 424 increases towards an outlet of the capillary 424. The cooling liquid changes its phase, as has been described above, and cools down the flexural resonator. The flexural resonator performs a flexural vibration or bending vibration, in contrast to the second joining tools 42 that are schematically illustrated in FIG. 1 or 5C, for example. Such flexural resonators are generally known and will, therefore, not be described in further detail herein. The influence of the capillary 424 on the mechanical properties of the flexural resonator may generally be neglected, in particular if the capillary 424 is arranged centrally in a vertical direction y of the flexural resonator's horn.

The cooling liquid that is used for evaporative cooling of the second joining tool 42, optionally, may further be used as a protective gas during the joining operations. The protective gas may positively impact the joining operations. Further, the gas that is created by an evaporative cooling process may be reused by compressing the gas and changing its phase back to its liquid form.

The temperature unit 421 may comprise a temperature sensor, for example. Such a temperature sensor (not specifically illustrated) may determine the temperature of the second joining tool 42. The temperature unit 421 may further comprise a control or regulation circuit. Such a control or regulation circuit may receive an information from the temperature sensor concerning an actual temperature of the second joining tool 42. The control or regulation circuit may be configured to increase or decrease an actual temperature of the second joining tool 42 to a desired temperature.

According to one example, the control or regulation circuit comprises a PID (proportional integral derivative) regulator. According to one example, the second joining tool 42 may be actively cooled down using an evaporative cooling technique. If a temperature sensor detects that the temperature of the second joining tool 42 is too low, the second joining tool 42 may be heated up using a control or regulation circuit.

The temperature sensor may comprise a contactless sensor such as an infrared temperature sensor, for example. The temperature unit, in addition to an evaporative cooling unit, may comprise a heater, such as a laser unit, for example. In many cases, a heating process is easier to control than a cooling process.

The described method may be implemented in all kinds of ultrasonic joining arrangements and technologies that are configured to form joints between at least two joining partners 10, 20 by means of ultrasonic sound. For example, the method and technology may further be used for ultrasonic bonding. The method generally works very well for linear bending welding techniques, as the geometry of the second joining tool 42 (e.g., sonotrode) of such arrangements is often designed such that a heat transfer of the sonotrode tip (tip of the sonotrode contacting the second joining partner 20) which generally heats up most of all, towards the cooler parts of the second joining tool 42 is comparably poor. If heat transfer away from the tip of the sonotrode is poor, the sonotrode tip generally heats up comparably fast during the joining operations.

Cooling of the second joining tool 42 may have several advantages. The difference between the temperature at the end of each of the plurality of joining operations and the temperature at the end of the following intermediate time interval is increased. However, the thermal conductivity between a tip of the second joining tool 42 and the position of the temperature unit 421 which is cooled down by the temperature unit 421 is increased as compared to conventional arrangements. Therefore, the time that is needed for cooling down the tip of the second joining tool 42, which contacts the joining partners 10, 20, may be reduced as compared to conventional arrangements without active cooling.

If the second joining tool 42 is cooled down using an evaporative cooling unit, the cooling medium may also be used as protective gas during the ultrasonic joining process, for example. A second joining tool 42 that is cooled down to very low temperatures, e.g., −25° C. or even −60° C., may have further advantages on the joining process. For example, a second joining tool 42 that is cooled down to temperatures below 0° C. may have an increased lifetime, as the material of the second joining tool 42 becomes more robust with lower temperatures. Further, the initial energy that is necessary to perform the joining process may increase if the second joining tool 42 is cooled down to very low temperatures. This may elongate the duration of the joining process. This may make it easier to control the joining process and to identify deviations of the materials. The spectrum of materials of the joining partners 10, 20 may increase, as well as the spectrum of the possible material combinations. For example, when actively cooling the second joining tool 42, the joining partners 10, 20 may comprise any materials which may generally not be heated above a certain threshold temperature. Many materials may not be used in conventional ultrasonic joining processes, because the joining partners may be prone to melting if the second joining tool 42 gets too hot. For example, IMS substrates (Insulated Metal Substrates) may generally not be used as joining partners in conventional ultrasonic joining processes. However, IMS substrates may be used in an ultrasonic joining process, if the second joining tool 42 is actively cooled down to below a certain threshold temperature, just to name one example. In some arrangements, the first joining partner 10 and/or the second joining partner 20 may be actively cooled in addition to the second joining tool 42.

Other materials such as aluminum or aluminum alloys, for example, may interconnect with the second joining tool 42 if heated to above a certain threshold temperature. Such materials, therefore, may not be used for the joining partners 10, 20 in conventional ultrasonic joining processes. However, such materials may be used if the second joining tool 42 is actively cooled down to below a certain threshold temperature such that the formation of an inter joining between the joining partner and the second joining tool 42 is prevented. Even further, the formation of defects within the joining partners 10, 20 or the joint that is formed between the joining partners may be prevented by actively cooling the second joining tool 42.

However, actively heating the second joining tool 42 may also have certain advantages. Generally, the difference between the temperature at the beginning of a joining operation and the temperature at the end of the same joining operation may be reduced by increasing the initial temperature at the beginning of the joining operation. This also reduces the time that is needed for the second joining tool 42 to cool down again during the following intermediate time interval. The maximum temperature that is reached at the end of the joining operations may be stabilized by actively heating the second joining tool 42. For example, the initial energy that is necessary for the joining operation may be reduced, as has been described above, because the energy level of the second joining tool 42 is already increased. This may reduce the duration of the individual joining operations. In this way, mechanical damages introduced by the joining operation may be reduced. This may be advantageous for comparably thin joining partners 10, 20, for example.

A joining arrangement may be configured to adjust the temperature profile of the first joining partner 10, the temperature profile of the second joining partner 20, the temperature profile of the first joining tool 41, and the temperature profile of the second joining tool 42 such that each temperature profile is identical or at least similar for each ultrasonic joining operation in a sequence of joining operations.

A joining arrangement may be configured to, during an intermediate time interval between two directly successive ultrasonic joining operations, adjust an initial temperature of the first joining partner 10 and an initial temperature of the second joining partner 20 such that the initial temperature of the first joining partner 10 and the initial temperature of the second joining partner 20 each are identical or at least similar at the beginning of each joining operations formed in a sequence of joining operations.

The joining arrangement may further comprise a temperature sensor configured to determine a temperature of the second joining tool 42, wherein the arrangement may be further configured to, by means of the temperature unit 421, adjust the temperature profile of the second joining tool 42 such that an initial temperature of the second joining tool 42 is identical or at least similar at the beginning of each joining operation in a sequence of joining operations.

The joining arrangement may further comprise a proportional integral derivative regulator that is configured to adjust the temperature profile of the second joining tool 42 based on the temperature determined by the temperature sensor.

Figure 7:
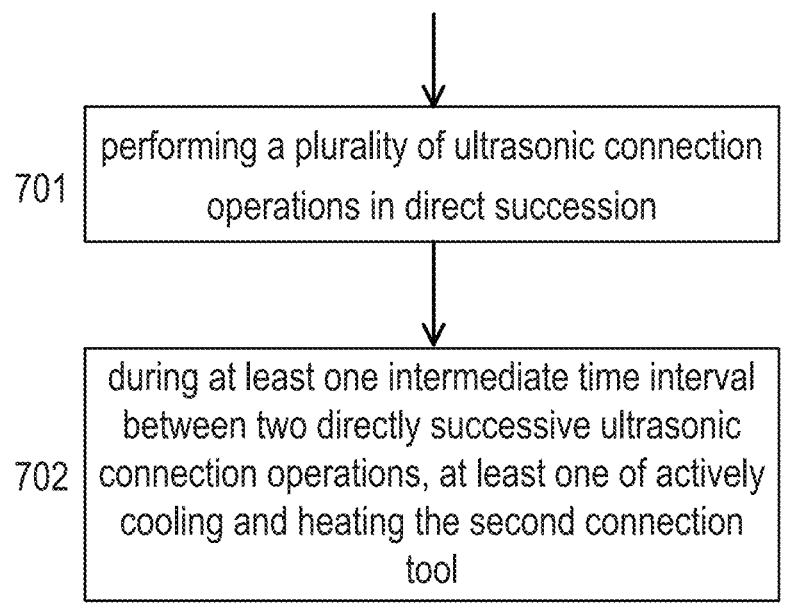
FIG. 7 illustrates an ultrasonic joining method.

Now referring to FIG. 7, a method for joining at least two joining partners 10, 20 is illustrated. The method comprises performing a plurality of ultrasonic joining operations in direct succession (step 701), wherein performing an ultrasonic joining operation comprises, with a second joining tool 42, applying pressure to a second joining partner 20 that is arranged adjacent to a first joining partner 10, thereby pressing the second joining partner 20 against the first joining partner 10, and, with the second joining tool 42, applying high-frequency ultrasonic vibrations to the joining partners 10, 20. The method further comprises, during at least one intermediate time interval between two directly successive ultrasonic joining operations, at least one of actively cooling and heating the second joining tool 42 (step 702).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof

What is claimed is:

1. A method for joining at least two joining partners, the method comprising:
    performing a plurality of ultrasonic joining operations in direct succession, wherein performing an individual ultrasonic joining operation comprises, with a joining tool, applying pressure to a second joining partner arranged adjacent to a first joining partner, thereby pressing the second joining partner against the first joining partner, and, with the joining tool, applying high-frequency ultrasonic vibrations to the joining partners; and
    during at least one intermediate time interval between two directly successive ultrasonic joining operations, actively cooling the joining tool by a temperature unit that comprises an evaporative cooling unit,
    wherein the evaporative cooling unit comprises a capillary comprising a first section having a first diameter and a second section having a second diameter that is smaller than the diameter of the first section, and wherein cooling liquid that passes through the capillary passes the second section and changes phase to a gaseous state when reaching the first section with the larger diameter.

2. The method of claim 1, wherein the joining tool is actively heated to a predefined temperature before performing a first one of the plurality of ultrasonic joining operations.

3. The method of claim 1, wherein the joining tool is actively heated during intermediate time intervals between less than 50% of the plurality of ultrasonic joining operations.

4. The method of claim 1, wherein each of the plurality of ultrasonic joining operations has a duration of between 50 ms and 10 s.

5. The method of claim 1, wherein each of the intermediate time intervals has a duration of between 200 ms and 30 s.

6. The method of claim 1, wherein the joining tool is heated or cooled by the temperature unit, and wherein the temperature unit is inactive during each of the plurality of ultrasonic joining operations.

7. The method of claim 1, wherein the evaporative cooling unit is disposed within the joining tool.

8. An ultrasonic joining arrangement, comprising:
    a first joining tool comprising a first support surface; and
    a second joining tool configured to perform a plurality of ultrasonic joining operations in direct succession, wherein performing an ultrasonic joining operation comprises applying pressure to a second joining partner and a first joining partner that are stacked on top of each other on the first support surface, thereby pressing the second joining partner against the first joining partner, and applying high-frequency ultrasonic vibrations to the joining partners,
    wherein the second joining tool comprises a temperature unit configured to at least one of actively cool down and heat up the second joining tool at least during one intermediate time interval between two directly successive ultrasonic joining operations,
wherein the temperature unit comprises an evaporative cooling unit, wherein the evaporative cooling unit comprises a capillary comprising a first section having a first diameter and a second section having a second diameter that is smaller than the diameter of the first section, and wherein cooling liquid that passes through the capillary passes the second section and changes phase to a gaseous state when reaching the first section with the larger diameter.

9. The ultrasonic joining arrangement of claim 8, wherein the second joining tool comprises a temperature sensor configured to detect a temperature of the second joining tool.

10. The ultrasonic joining arrangement of claim 8, wherein the temperature unit comprises a laser unit or an induction unit configured to actively heat the second joining tool.

11. The ultrasonic joining arrangement of claim 8, wherein the second joining tool comprises a sonotrode.

12. The ultrasonic joining arrangement of claim 8, further comprising a joining arrangement configured to adjust a temperature profile of the first joining partner, a temperature profile of the second joining partner, a temperature profile of the first joining tool and a temperature profile of the second joining tool such that each temperature profile is identical or at least similar for each ultrasonic joining operation in a sequence of joining operations.

13. The ultrasonic joining arrangement of claim 12, further comprising a temperature sensor configured to determine a temperature of the second joining tool, wherein the joining arrangement is further configured to, by means of the temperature unit, adjust a temperature profile of the second joining tool such that an initial temperature of the second joining tool is identical or at least similar at the beginning of each joining operation in a sequence of joining operations.

14. The ultrasonic joining arrangement of claim 13, further comprising a proportional integral derivative regulator configured to adjust the temperature profile of the second joining tool based on the temperature determined by the temperature sensor.

15. The ultrasonic joining arrangement of claim 8, further comprising a joining arrangement configured to, during an intermediate time interval between two directly successive ultrasonic joining operations, adjust an initial temperature of the first joining partner and an initial temperature of the second joining partner such that the initial temperature of the first joining partner and the initial temperature of the second joining partner each are identical or at least similar at the beginning of each joining operation in a sequence of joining operations.

16. The ultrasonic joining arrangement of claim 8, wherein the evaporative cooling unit is disposed within the second joining tool.

* * * * *